Patented Oct. 6, 1931

1,826,589

UNITED STATES PATENT OFFICE

HARRY A. ZUCH, OF NEW YORK, N. Y.

ELECTRICALLY CONTROLLED MECHANISM FOR DETECTING LEAKS IN CYLINDRICAL CANS OR CONTAINERS

Application filed January 30, 1928. Serial No. 250,682.

This invention relates to electrically controlled mechanism for detecting leaks in cylindrical cans or containers, and has for an object particularly the detection of leaks in cans or containers such as are customarily used for the preservation of foodstuffs and the like. The term "can" or "cans" used herein will be understood to refer to containers of various sorts, in the testing of which this apparatus might be found useful.

Another object is to provide such a mechanism which will operate automatically and electrically so as to pick out from the series of cans to be tested those which are bulging at the ends.

Another object is to provide such a mechanism in which a solenoid is energized or not according to the condition of the particular can being tested.

A further object is to provide certain improvements in the form, construction, and arrangement of the several parts whereby the above named and other objects may effectively be attained.

In the canning of foodstuffs and the like it is an accepted practice to create at least a partial vacuum in the cans and it is considered important that this vacuum be maintained, for the better preservation of the material in the cans. Following the sealing of the filled cans it is customary to place them under high pressure in order to force air into the can through any leak which may exist therein; upon then exposing them to atmospheric pressure the high pressure in the leaky cans will cause them to bulge, so that they may be detected and thrown out. The apparatus shown and described herein serves to select mechanically and electrically these defective and bulging cans.

A practical embodiment of the invention is represented in the accompanying drawings, in which Fig. 1 represents a sectional view taken radially of the apparatus, along the plane C—C of Fig. 2, looking in the direction of the arrows; parts being shown in elevation, and parts being broken away.

Figure 1:
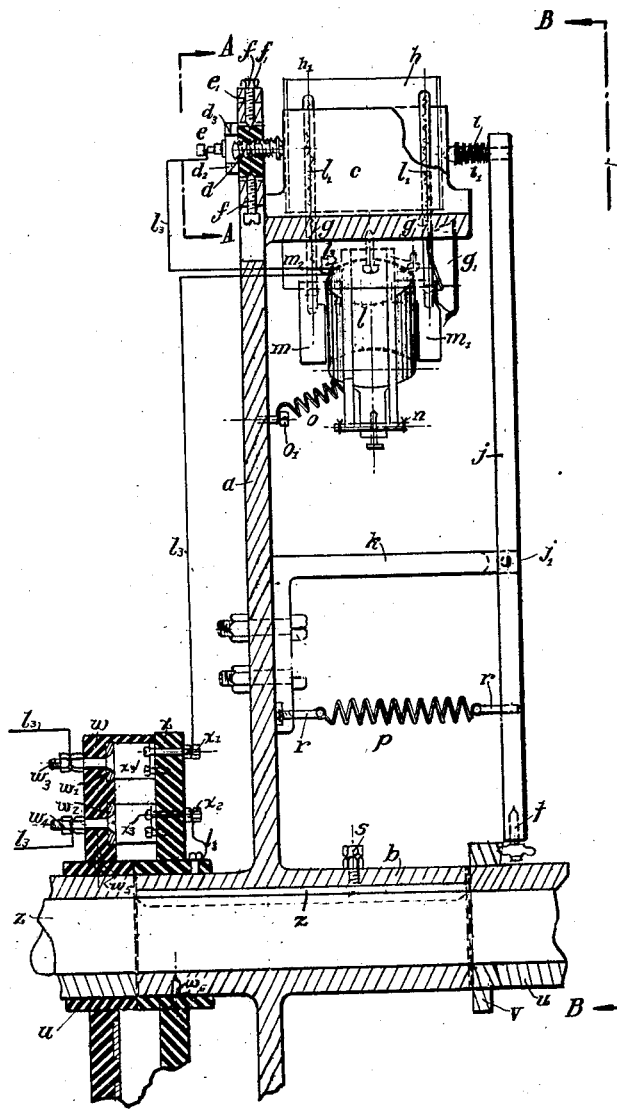

Referring to the drawings, it will be seen that the apparatus includes a disc or web $a$ having a hub $b$ and provided, near its outer edge, with an annular flange from which project teeth $c$ adapted to receive and hold in position a series of cans $h$, $h_1$, to be tested. In the outer edge of the web $a$ at a point opposite each space between adjacent teeth $c$ is mounted a contact plug $d$, supported in the center of a rectangular rocker plate $d_4$. The rocker plate $d_4$ is provided with stabilizing contact plug bolts $e$ and $e_1$, and the plate is held in place by bolts $f$ which fit into holes in the top and bottom thereof, so as to permit a slight oscillation of the plate about the bolts $f$ as an axis. Stops $d_2$ and $d_3$ are provided in order to limit the extent of the movement just referred to, and a cover adapted to bridge the space between adjacent portions of the web edge and to carry one of the bolts $f$, is shown as secured to said portions by bolts $f_1$.

To the inner surface of the annular flange bearing the teeth $c$ is bolted a block $m_2$ adapted to support the solenoid block $l_3$ and solenoid $l$. Hollow fingers or holders $g$, which may contain coil springs $l_1$ are mounted on lever arm $m_1$ which is bolted to the laminated lower jaw portion $m$ pivotally supported at $n_1$, so that that the solenoid $l$ may act to move said fingers $g$ into or out of tangential engagement with the cans $h$, $h_1$. It will be understood that the fingers $g$ project through slits or other apertures in the flange and in teeth $c$ in order to be operative for the purpose stated. The jaw $m$ may be normally held in a retracted position by means of the spring $o$ attached to a bolt $o_1$ on the side of web $a$, and the extent of its movement may be limited by means of an adjustment screw $n$, or the like.

A bracket $k$ is secured to the web $a$ by bolts $y$ and at its outer end is mounted a rocker-arm $j$, pivotally secured by a pin $j_2$. The outer end of the rocker-arm bears a push bolt $i$ and spring $i_1$. The inner portion of the rocker-arm is drawn toward the web $a$ by a spring $p$ secured to fastenings $r, r$ on the arm and web, and its inner end is provided with a roller $t$ which bears continuously against a fixed annular cam $v$. The cam $v$ is formed so as to move the inner end of the rocker-arm in such a manner that the outer end will be held against the end of the can during that part of its travel immediately preceding its delivery, and until the desired point of release is reached. The spring $i_1$ serves to give the bolt $i$ a degree of resiliency sufficient to safeguard the apparatus against injury in case of undue resistance by a can end, while not interfering with the positive action of the bolt in all normal cases.

On the hub $b$ is mounted a disc $x$ which may be of fiber and metal and is provided with a suitable number of copper contact pieces $x_3$, arranged at selected points thereon. Each piece $x_3$ is provided with a binding post $x_1$ or $x_2$; and the disc $x$ may be secured to the hub $b$ by means of a screw $w_6$ or the like.

On the shaft casing adjacent the hub $b$ is mounted a fixed disc $w$ similar to disc $x$ but provided with a short arcuate conducting element $w_1$ and an annular conducting element $w_2$, having binding posts $w_3$ and $w_4$, respectively. The disc $w$ may be secured in position upon or adjacent to a pillow-block $u$ by means of a screw $w_5$ or the like.

While only one solenoid, rocker-arm, etc., is shown and described herein it will be understood that each can-containing space (between adjacent teeth $c$) is provided with an identical set of parts which function in an identical manner, as hereinabove set forth.

The outer series of contact pieces $x_3$ includes one for each solenoid, while there is but a single inner contact piece. The latter is directly grounded from the binding post $x_2$ to the hub of the apparatus, whereas the former are connected by wiring $l_3$, each to its own solenoid. Current is supplied to the binding posts $w_3$ and $w_4$ whence is it conducted to the elements $w_1$ and $w_2$, in contact with the pieces $x_3$. The solenoid circuit is completed through the wiring $l_3$, contact plug $d$ when this plug comes in contact with the end of a can $h_1$, and through the can to ground. It will be understood that the plug $d$ and bolt $i$ may be very finely adjusted so that a good can will not be pushed against the contact plug $d$ while a slightly bulged can will be sufficiently longer so that it will touch the contact plug, completing the solenoid circuit to energize the solenoid which moves the fingers $g$ into tangential engagement with the can. This action is timed to take place at a point in the arc of travel of the disc or web $a$, approximately indicated by the radial line $d_1$ in Fig. 3, that is, just before the good cans $h$ are to be delivered by gravity onto a delivery shelf or the like. If a can $h_1$ is not good it is held against gravity by fingers $g$ until it has passed the upper delivery shelf and then is released to be conducted away as shown in the lower portion of Fig. 3. Each solenoid is subject to being energized only during the time that its particular contact piece $x_3$ is in contact with the arcuate conducting element $w_1$.

The hub $b$ is shown keyed to its shaft $z$ and secured by a set screw $s$. The shaft may be driven from a suitable source of power in a manner readily understood, and the apparatus shown may be run at a speed sufficient to handle as many as 700 to 800 cans per minute, in a small machine.

Figures 2, 2A, 3:
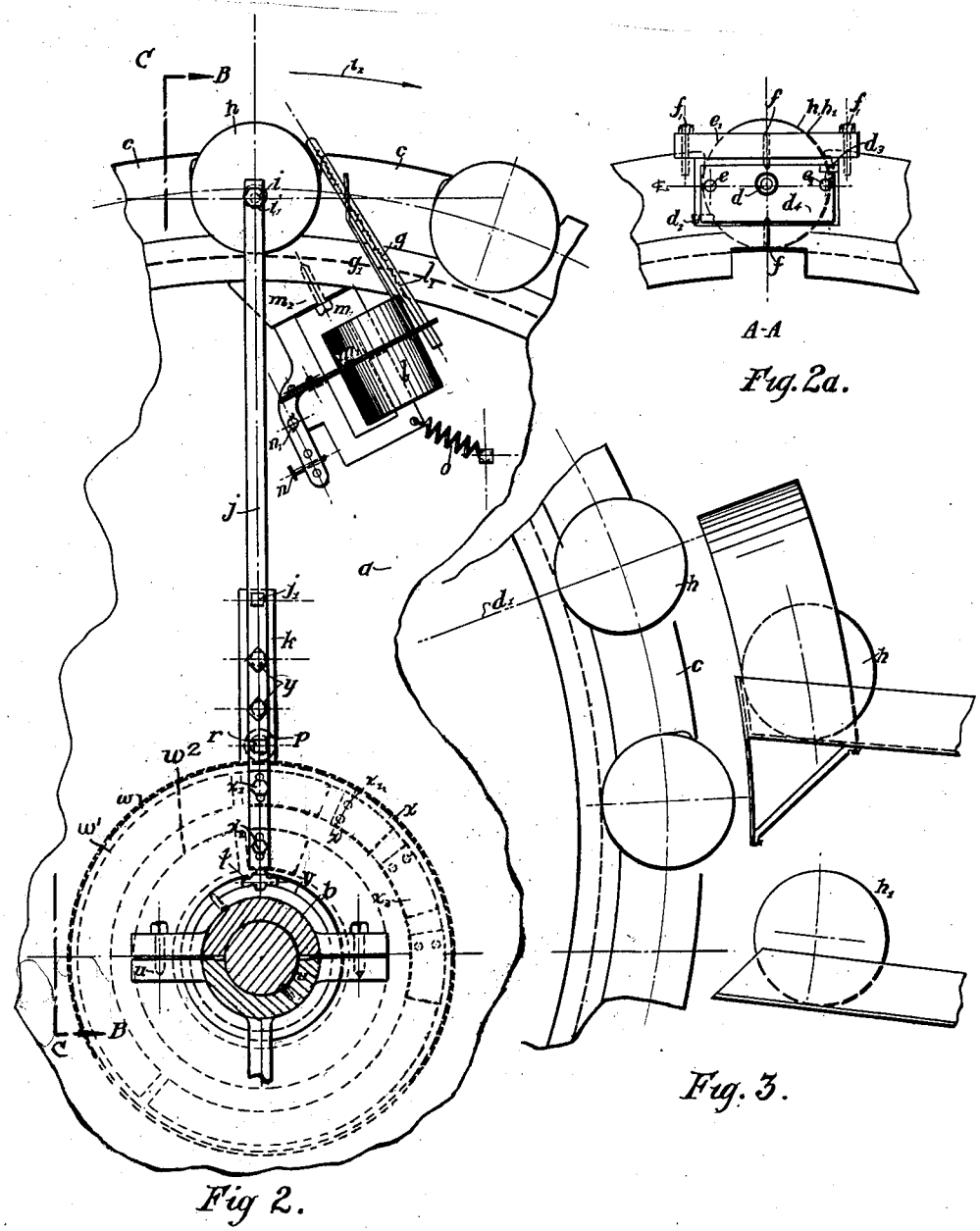
Fig. 2 represents a face view of the apparatus looking in the direction of the arrows B—B of Fig. 1; parts being broken away.
Fig. 2a represents a detail elevation of a portion of the apparatus looking in the direction of the arrows A—A of Fig. 1; parts being broken away.
Fig. 3 represents a detail elevation of another portion of the apparatus, showing diagrammatically an arrangement for receiving at different points the good or bad cans after being tested.

The operation of this apparatus will be apparent from the foregoing description but it may conveniently be summarized as follows:

The filled cans to be tested are fed by any well known conveying means to the teeth $c$ carried by the disc or web $a$, one can being fed into the space between each two adjacent teeth. At the point where the cans are thus supplied to the teeth, the fingers $g$ are being held out of the way by springs $o$, and the bolts $i$ are being held away from the cans by means of springs $p$ in conjunction with the cam $v$. The cans are carried around by the rotation of the disc $a$ until they have reached a point such as that indicated at $d_1$ (Fig. 3). At about this point the roller $t$ on rocker-arm $j$ reaches the protruding or high portion of cam $v$ and is thereby moved out so that the outer end of the rocker-arm is moved toward the can. The bolt $i$ contacts with the end of the can and moves the can toward the contact plug $d$; the extent of this movement may be accurately determined by means of cam $v$ and bolt $i$, and the adjustment should be such that a good can will not quite reach and touch the contact plug $d$, whereas a slightly bulging (defective) can will contact with said plug. The wiring of the apparatus is such that the solenoid circuit may be completed by the contact of a can end with the contact plug $d$ (the can being grounded by its contact with the apparatus). The time during which the bolt $i$ is held against the can corresponds with the time during which current may reach the particular solenoid in question through the contact of its contact piece $x_3$ with the arcuate conducting element $w_1$. This period is determined to be at and preceding the point of delivery for good cans $h$, it being understood that such cans do not touch contact plug $d$, do not cause the solenoid to be energized, and so are free to be delivered by gravity onto an upper delivery shelf or the like, as shown in Fig. 3. A defective can $h_1$, however, completes the solenoid circuit and causes the fingers $g$ to engage its sides, whereby it is held against gravity, carried past the upper delivery shelf and deposited at a lower point (Fig. 3), after the circuit has been broken by the passage of the contact piece $x_3$ beyond the end of the conducting element $w_1$, so as to permit the fingers $g$ to be withdrawn from engagement with the can.

It will be understood that various changes may be resorted to in the form, construction and arrangement of the several parts, without departing from the spirit and scope of my invention, and hence, I do not intend to be limited to the details herein shown and described, except as they may be included in the claims.

What I claim is:—

1. An apparatus of the character described comprising, a conveyor for cans to be tested, means for receiving cans from the conveyor at a plurality of points, electrically actuated holding means carried by the conveyor for retaining certain cans on the conveyor longer than other cans, and contact means cooperating with the ends of the cans in accordance with the shape thereof for controlling the operation of said electrically actuated holding means.

2. An apparatus of the character described comprising, a conveyor for cans to be tested, means for receiving cans from the conveyor at a plurality of points, electrically actuated fingers carried by the conveyor for retaining selected cans on the conveyor, and contact means cooperating with the ends of the cans in accordance with the shape thereof for controlling the actuation of the fingers, said means including the cans to be retained.

3. An apparatus of the character described comprising, a conveyor for cans to be tested, means for receiving cans from the conveyor at a plurality of points, intermittently actuated mechanical means for positioning each can axially on the conveyor, electrically actuated fingers for retaining selected cans on the conveyor, and contact means for controlling the actuation of the fingers, said means including the cans to be retained.

4. An apparatus of the character described comprising, a conveyor for cans to be tested, means for receiving cans from the conveyor at a plurality of points, a cam adjacent the conveyor, a rocker-arm carried by the conveyor and intermittently actuated by the cam for positioning each can axially on the conveyor, electrically actuated fingers carried by the conveyors for retaining selected cans on the conveyor, and contact means for controlling the actuation of the fingers, said means including the cans to be retained.

5. In an apparatus of the character described, a solenoid, can-retaining fingers adapted to be moved into operative position by the solenoid, and a solenoid circuit, said circuit including the solenoid coil, a contact plug, and the can to be tested, whereby the contact of the can against the plug will serve to close the circuit, energize the solenoid and move the fingers into operative position.

In testimony that I claim the foregoing I have hereunto set my hand this 21st day of January, 1928.

HARRY A. ZUCH.